United States Patent
Edgmon

(10) Patent No.: US 11,492,957 B2
(45) Date of Patent: *Nov. 8, 2022

(54) APPARATUS AND METHOD FOR INCREASING AIR FLOW AND AIR VELOCITY ENTERING THE AIR INTAKE OF AN INTERNAL COMBUSTION ENGINE

(71) Applicant: RoadSkulls V-Twin Performance LLC, Denver, CO (US)

(72) Inventor: Kevin L. Edgmon, Denver, CO (US)

(73) Assignee: ROADSKULLS V-TWIN PERFORMANCE, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,529

(22) Filed: Nov. 16, 2020

(65) Prior Publication Data
US 2021/0071566 A1 Mar. 11, 2021

Related U.S. Application Data

(63) Continuation of application No. 16/226,087, filed on Dec. 19, 2018, now Pat. No. 10,837,352.

(51) Int. Cl.
*F02B 33/40* (2006.01)
*F02B 39/10* (2006.01)
*F02M 35/10* (2006.01)

(52) U.S. Cl.
CPC .............. *F02B 33/40* (2013.01); *F02B 39/10* (2013.01); *F02M 35/10019* (2013.01); *F02M 35/10216* (2013.01)

(58) Field of Classification Search
CPC ... F02B 33/40; F02B 39/10; F02M 35/10019; F02M 35/10216
See application file for complete search history.

(56) References Cited

U.S. PATENT DOCUMENTS

| | | | |
|---|---|---|---|
| 6,280,493 B1 * | 8/2001 | Eubank | B01D 45/14 55/398 |
| 2008/0016833 A1 * | 1/2008 | Sheidler | A01D 41/1252 55/385.3 |
| 2011/0180036 A1 * | 7/2011 | Chuang | F02B 39/10 123/703 |
| 2013/0167490 A1 | 7/2013 | Barron et al. | |
| 2014/0261340 A1 | 9/2014 | Cheng | |
| 2015/0075121 A1 * | 3/2015 | Leitner | F02M 35/162 55/309 |
| 2018/0334954 A1 * | 11/2018 | Banker | F02B 33/44 |

* cited by examiner

*Primary Examiner* — Brandon D Lee
(74) *Attorney, Agent, or Firm* — Samuel M. Freund; Cochran Freund & Young LLC

(57) ABSTRACT

Apparatus and method for directing airflow into the air intake (carburetor or fuel injection system) of an internal combustion engine for increasing air flow velocity and the quantity of air reaching the cylinder or cylinders thereof through the use of an electrically powered fan, are described. The fan is installed inside of the air filter element such that when the air intake throttle plates are closed or partially closed, the unused airflow exits the apparatus to relieve the pressure created by the fan, and when additional air is needed by the engine, air can enter the filter element. The fan may be continuously operated during the operation of the motor, and at all engine speeds.

7 Claims, 11 Drawing Sheets

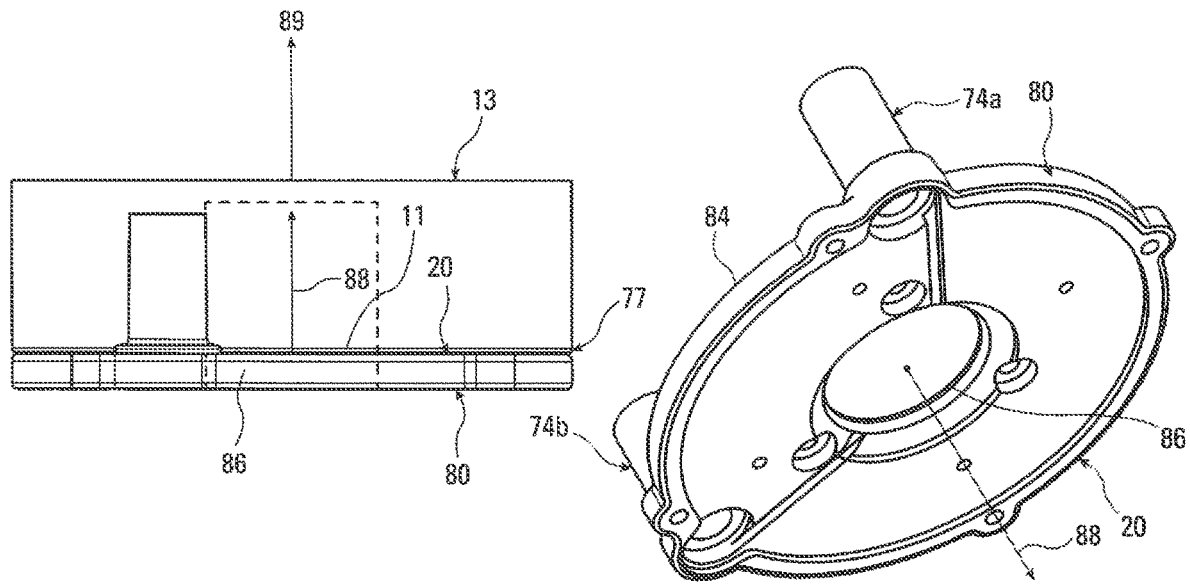
FIG. 6C
FIG. 6A
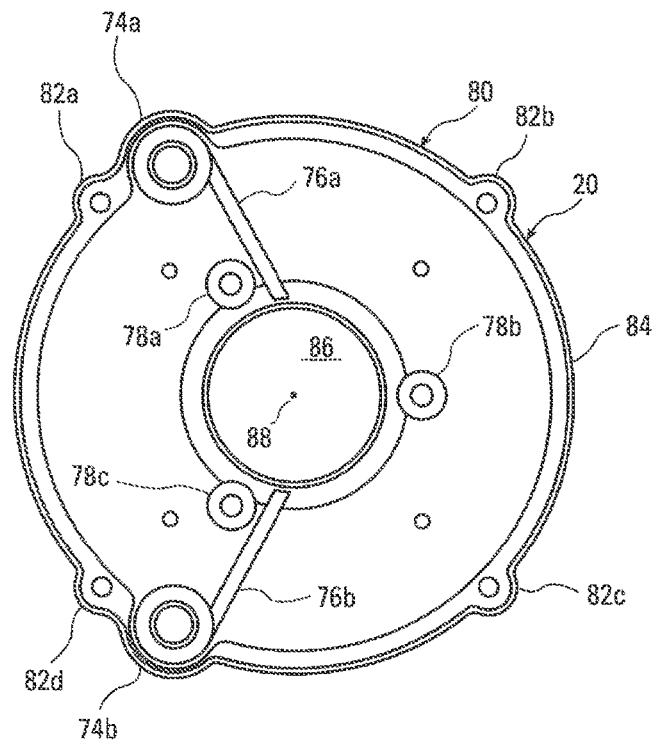
FIG. 6B

APPARATUS AND METHOD FOR INCREASING AIR FLOW AND AIR VELOCITY ENTERING THE AIR INTAKE OF AN INTERNAL COMBUSTION ENGINE

CROSS REFERENCE TO RELATED APPLICATION

The present patent application is a continuation of U.S. patent application Ser. No. 16/226,087, entitled "Apparatus and Method for Increasing Air Flow and Air Velocity Entering the Air Intake of an Internal Combustion Engine," which was filed with the U.S. Patent & Trademark Office on Dec. 19, 2018, and which is specifically incorporated herein by reference for all that it discloses and teaches.

BACKGROUND

Increasing air flow velocity and flow volume is well known for improving combustion efficiency for internal combustion engines. Currently available devices suitable for carbureted or fuel injected engines provide increased air flow only at full engine throttle. Turbo and other supercharging systems, which employ continuously running centrifugal impellers, are expensive and require significant power to operate.

SUMMARY

Embodiments of the present invention overcome the disadvantages and limitations of the prior art by providing an apparatus and method for improving the torque and horsepower of internal combustion engines.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

To achieve the foregoing, and in accordance with the purposes of the present invention, as embodied and broadly described herein, an embodiment of the apparatus for increasing the air velocity and volume entering a carburetor or a fuel injection system having an air intake port for an internal combustion engine, hereof, includes: a backing plate having a port concentric with the air intake port and disposed such that air passing through the port of the backing plate flows into the air intake port; a fan having a rotor with an axis of rotation driven by an electric motor; a fan support member attached to the backing plate having spacer members for holding the axis of rotation of the rotor of the fan perpendicular to the port of the backing plate wherein the rotor is spaced apart from the backing plate, forming a volume between the backing plate and the fan; an air filter element having a first end, a closed second end, and a hollow interior for enclosing the electric fan and said fan support member, the first end of the air filter element being in contact with the backing plate; and a clamp member for holding said filter element against the backing plate; whereby the fan directs a flow of air entering the air filter element into the backing plate port wherein air flow in excess of that entering the air intake port flows away from the air intake port through the volume and through the air filter element.

In another aspect of the present invention and in accordance with is purposes the method for increasing the air velocity and volume entering a carburetor or a fuel injection system having an air intake port for an internal combustion engine, hereof, includes: providing a fan having an electric motor, an air intake, an air exhaust, and a chosen air flow, the fan being spaced apart from the air intake port; filtering the air intake for the fan; directing air flowing from the air exhaust of the fan having a pressure greater than ambient pressure into the air intake port; and permitting air from the air exhaust of the fan that does not pass into the air intake port to flow away from the fan and the air intake port of the internal combustion engine.

Benefits and advantages of the present invention include, but are not limited to, providing an apparatus and method for improving the torque and horsepower of internal combustion engines by increasing the air flow velocity and flow volume entering a carburetor or a fuel injection system having an air intake for the internal combustion engine.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 6A is a schematic representation of a top perspective view of an embodiment of the backing plate of the apparatus of the present invention, which also serves as the inner clamping member of the apparatus, illustrating attachment tubes for the crankcase breather of a motorcycle, and channels for directing any oil into the carburetor or fuel injector intake, FIG. 6B is a schematic representation of a top view thereof, and FIG. 6C is a schematic representation of a side view of the backing plate of the present invention.

DETAILED DESCRIPTION OF THE INVENTION

Briefly, embodiments of the present apparatus for directing airflow into the air intake (carburetor or fuel injection system) of an internal combustion engine for increasing air flow velocity and air flow quantity (cubic feet per minute, or CFMs) reaching the cylinders thereof, include the use of an electrically powered fan. The fan is IP 68 rated (dust-free and waterproof), and installed inside of the air filter. When the air intake throttle plates are partially closed, excess (unused) airflow exits the apparatus through the air filter to relieve the pressure created by the fan. The fan may be continuously operated during the operation of the motor, and at all engine speeds.

Embodiments of the invention improve fuel mileage (instant and average), provide cooler air intake temperatures, and permit the engine to run cooler, even when idling with lithe external airflow past the motor for air-cooled motorcycle engines. Intake air velocity is increased, which it is believed improves fuel atomization and improves combustion.

Figure 1:
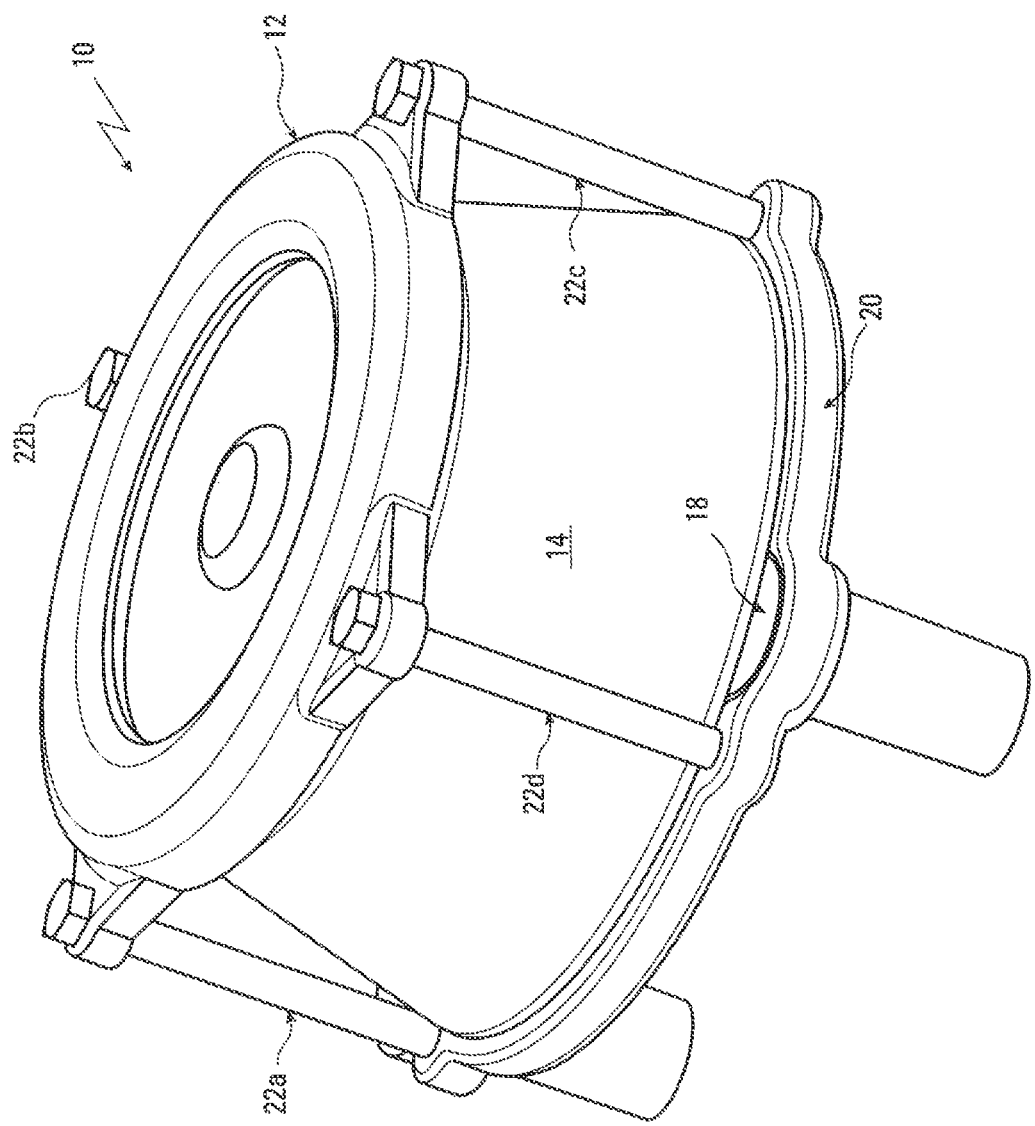
FIG. 1 is a is a schematic representation of an assembled top perspective view of an embodiment of the apparatus of the present invention, as would be mounted over the air intake of a carburetor or fuel injector of a motorcycle engine, illustrating the clamp member, the air filter element, a portion of the fan support member, the backing plate, and the external clamping bolts, the fan being internal to the assembled apparatus.

Reference will now be made in detail to the present embodiments of the invention, examples of which are illustrated in the accompanying drawings. In the Figures, similar structure will be identified using identical reference characters. It will be understood that the FIGURES are presented for the purpose of describing particular embodiments of the invention and are not intended to limit the invention thereto. Turning now to FIG. 1, FIG. 1 a schematic representation of an assembled top perspective view of an embodiment of apparatus, 10, of the present invention, as would be mounted over the air intake 11, of a carburetor or fuel injector 13, of a motorcycle engine, shown in FIG. 6C hereof, illustrating clamp member, 12, air filter element, 14, a portion of fan support member, 18, backing plate, 20, and external clamping bolts, 22, the fan being internal to assembled apparatus 10.

Figure 2C:
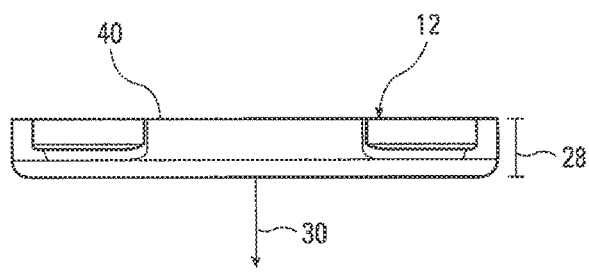
FIG. 2C is a schematic representation of a side view of the outer clamp member of the apparatus of the present invention.
Figure 2A:
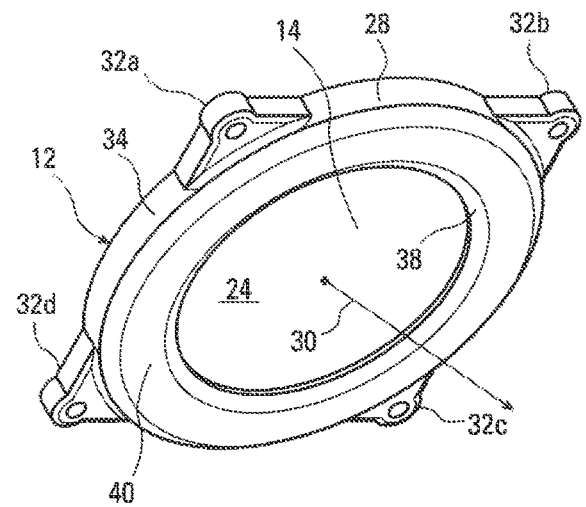
FIG. 2A is a schematic representation of a top perspective view of an embodiment of the outer clamp member of the apparatus of the present invention.
Figure 2B:
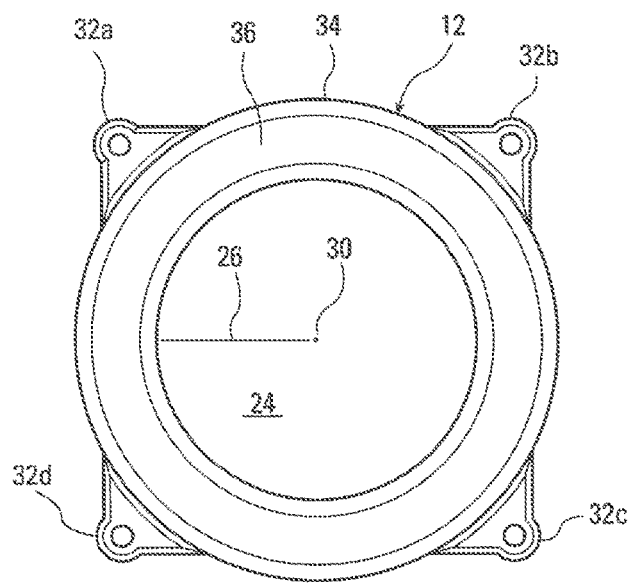
FIG. 2B is a schematic representation of a bottom view thereof.

FIG. 2A is a schematic representation of a top perspective view of an embodiment of outer clamp member, 12, of apparatus 10 of the present invention, and FIGS. 2B and 2C are schematic representations of a bottom view and a side view thereof, respectively. Clamp member 12 has cylindrical interior, 24, open at both ends, with a chosen radius, 26, a selected height, 28, and axis, 30. Projections, 32a-32d, arranged symmetrically around the outer surface, 34, of clamp member 12, and attached thereto, or integrally formed therewith, have holes therein to receive clamping bolts 22a-22d. Holes for clamping bolts 22a-22d may be located in the body, 36, of clamp member 12 if clamp member 12 is made sufficiently large that bolt holes 32a-32d can be disposed outside of air filter element, 14. Chamfer, 38, is cut in bottom surface, 40, of clamp member 12 to accommodate top surface, 42, of filter element 14. Clamp member 12 may be constructed from metal, such as aluminum, carbon fiber, and Kevlar or other plastics.

Figure 3C:
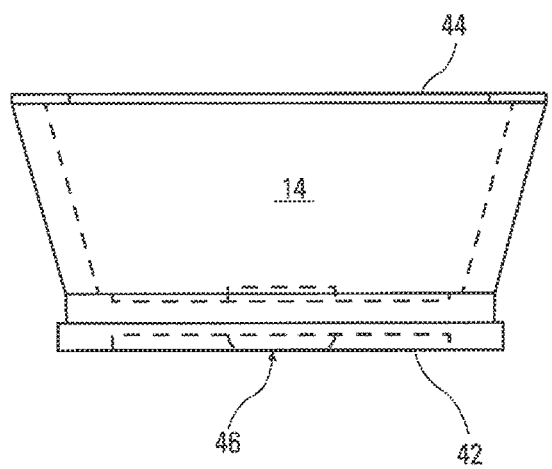
FIG. 3C is a schematic representation of a side view of the filter element of the apparatus of the present invention.
Figure 3A:
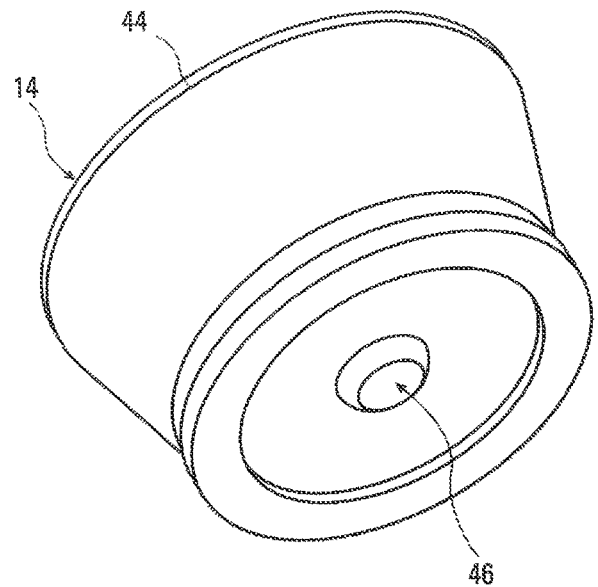
FIG. 3A is a schematic representation of a top perspective view of an embodiment of the air filter element of the apparatus of the present invention.
Figure 3B:
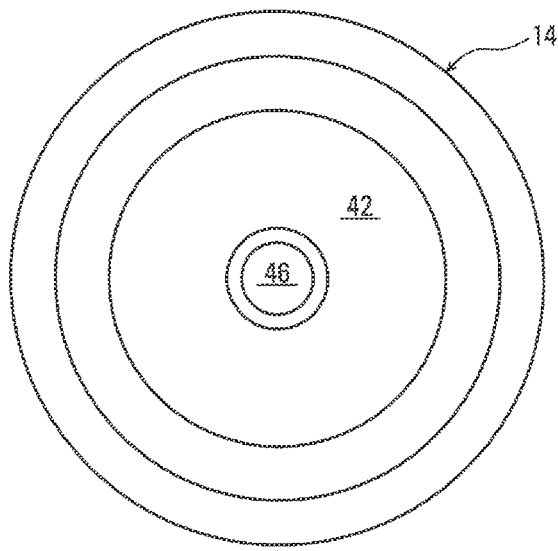
FIG. 3B is a schematic representation of a top view thereof.

FIG. 3A is a schematic representation of a top perspective view of an embodiment of air filter element, 14, while FIGS. 3B and 3C are schematic representations of a top view and a side view thereof. Commercially available high air flow filter elements constructed from paper or polyester foam materials, as examples, may be employed. As shown in FIGS. 3A-3C, filters having a hollow frustoconical shape open at large end, 44, have been found to be effective, although other shapes, such as a cylinder having one open end, are anticipated to be functional as well.

Some filter elements have a hole in the center of closed top surface 42 for use with other mounting systems. For the embodiment of the air filter element 14 of the present invention used with clamp member 12, cap 46 is used to seal this hole against leakage of air therethrough. Cap 46 may be made from plastic or metal. More efficient airflow is expected to be obtained if top surface 42 of filter element 14 comprises filter material, as opposed to material which is impermeable to air.

Figure 4C:
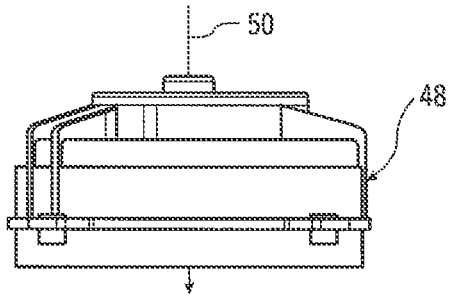
FIG. 4C is a schematic representation of a side view of the fan of the apparatus of the present invention.
Figure 4A:
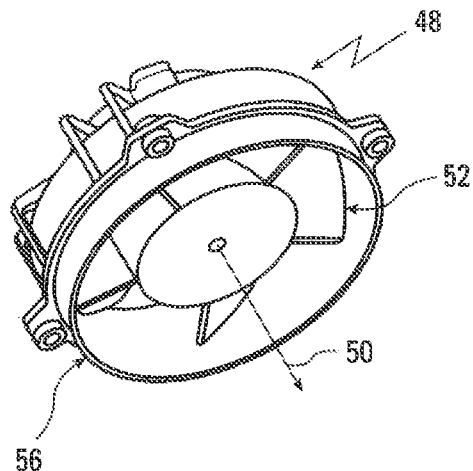
FIG. 4A is a schematic representation of a top perspective view of an embodiment of the electric fan of the apparatus of the present invention.
Figure 4B:
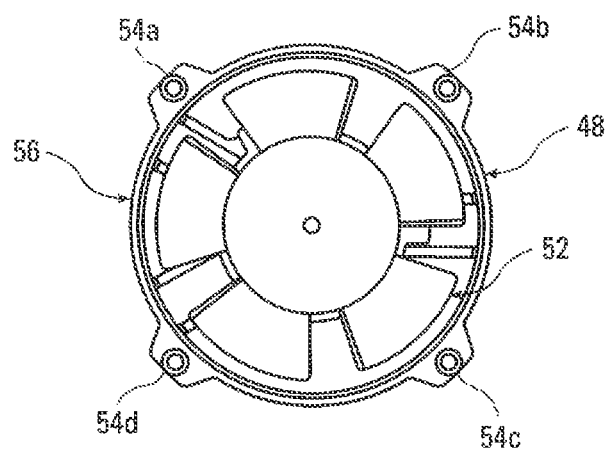
FIG. 4B is a schematic representation of a top view thereof.

FIG. 4A is a schematic representation of a top perspective view of an embodiment of commercially available electric axial cooling fan, 48, of apparatus 10 of the present invention, and FIGS. 4B and 4C are schematic representations of a top view and thereof, and FIG. 4C is a schematic representation of a side view of the electric fan of the apparatus of the present invention. Fan 48 has axis, 50, collinear with the axis of rotation of fan blades, 52, and with axis 30 of clamp member 12. Fan 48 is IP 68 rated (dust-free and waterproof), and installed inside of air filter element 14. Ingress Protection (IP) ratings are used to define levels of sealing effectiveness of electrical enclosures against intrusion from foreign bodies (dust, dirt, and the like) and moisture, and are defined in international standard EN 60529. Holes, 54a-54d, in frame, 56, of fan 48, are used to mount fan 48 on fan support member 18 illustrated in more detail in FIGS. 5A-5C hereof. Not shown in FIGS. 4A-4C are the electrical connections to fan 48, as will be described in FIG. 9 below. As an example, control/electric power wires from fan controller, 94 (FIG. 9, hereof), may be passed between the engine and backing plate 20, and further passed through hole 86.

Figure 9:
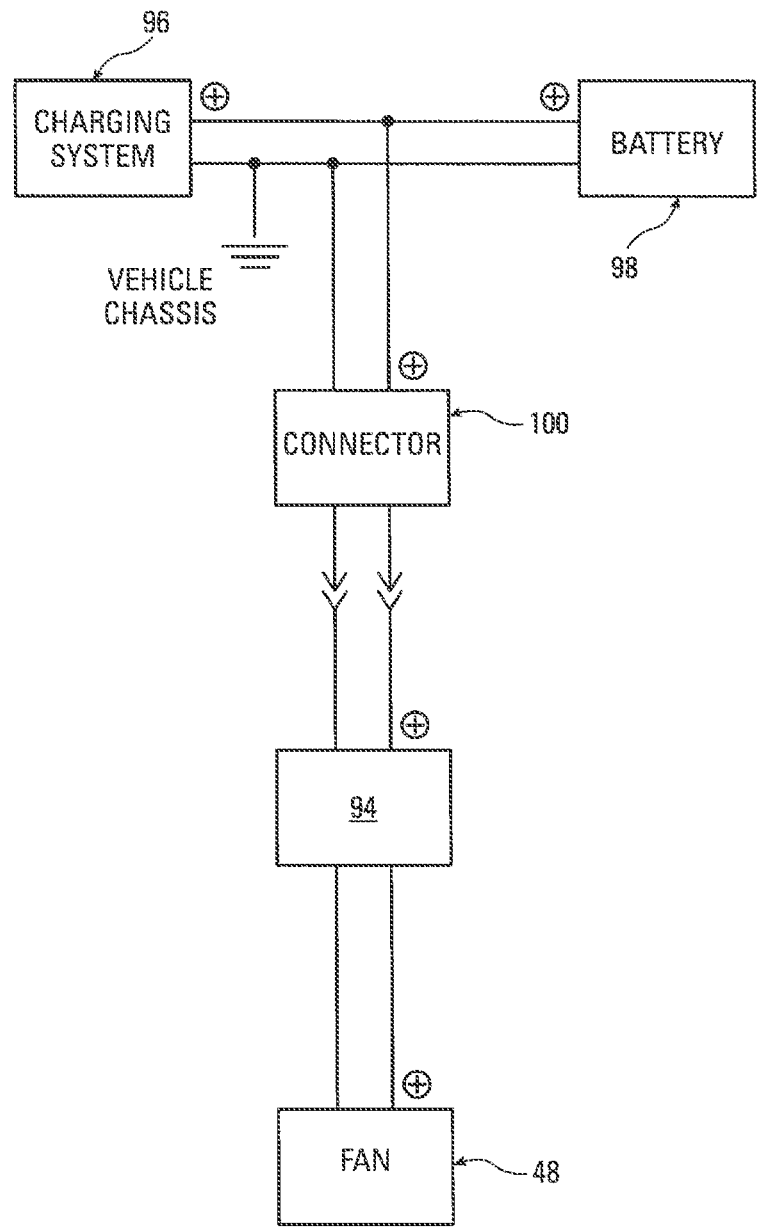
FIG. 9 is a schematic representation of fan control system disposed in the vehicle in which the apparatus of the present invention is installed.

As will be discussed in more detail below, fans effective for use in embodiments of the present invention have an airflow between 150 and 350 cfm, which satisfy the air requirements of currently available Harley-Davidson Dyna® motorcycles, and fall within Environmental Protection Agency (EPA) guidelines for volumetric efficiency (VE). Clearly, other fan cfm outputs, fan configurations, and various chosen fan speeds coordinated with engine rpm as the air flow requirements of the engine changes, may be required when using embodiments of the present apparatus on other internal combustion engines. As will also be discussed below, fan 48 may be operated using the DC (rectified AC or battery), or AC (unrectified) electrical system of the vehicle onto which embodiments of the present invention are mounted, independent of whether the internal combustion engine is running or off. FIG. 9, below describes the fan control system of the vehicle.

Figure 5C:
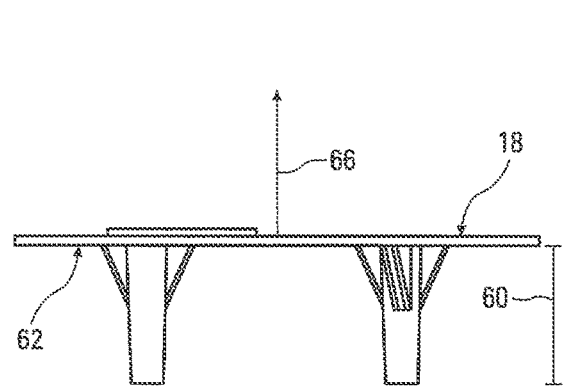
FIG. 5C is a schematic representation of a side view of the fan support member of the present invention.
Figure 5A:
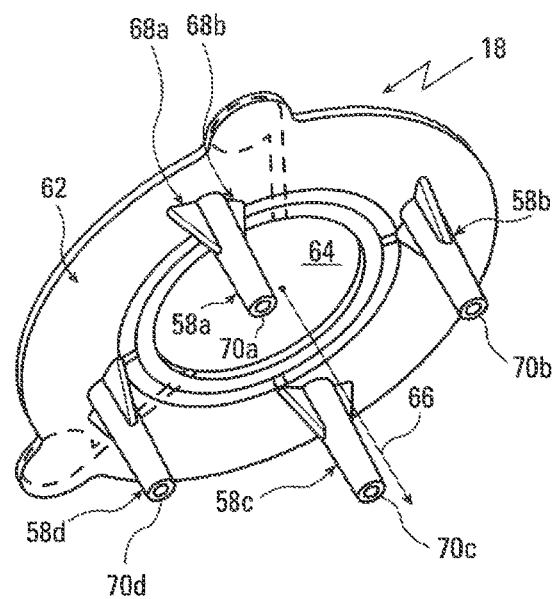
FIG. 5A is a schematic representation of a top perspective view of an embodiment of the fan support member of the apparatus of the present invention, illustrating spacer members for supporting the electric fan at a chosen distance from the base of the fan support member, and slots in the base for increasing air flow through the fan support member.
Figure 7:
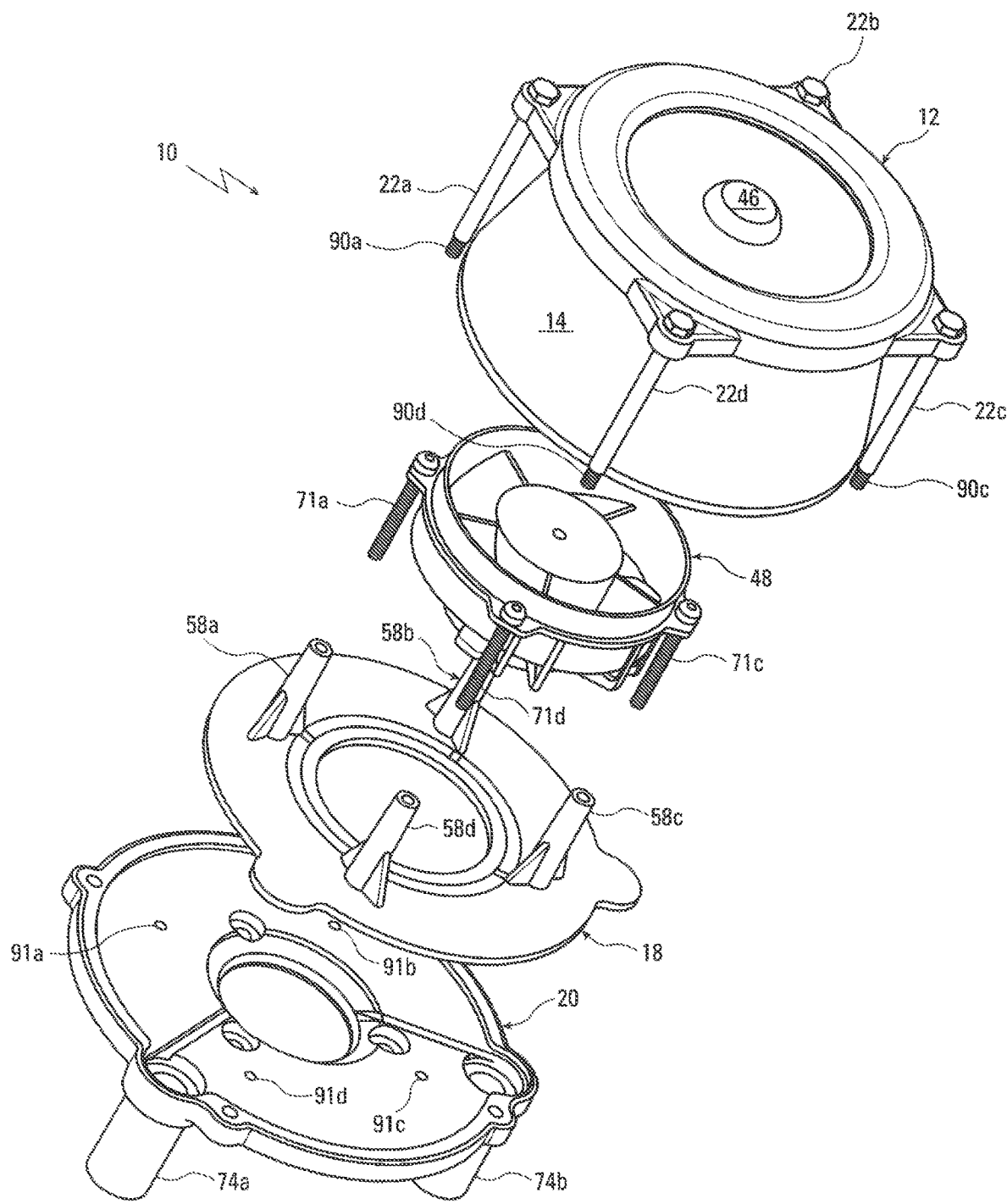
FIG. 7 is a schematic representation of an exploded top perspective view of the parts of an embodiment of the apparatus of the present invention, illustrating the outer clamp, the filter element, the electric fan, the fan support member, the backing plate, and two sets of mounting bolts, as shown in FIGS. 1-6 hereof.

FIG. 5A is a schematic representation of a top perspective view of an embodiment of fan support member, 18, of apparatus 10 of the present invention, illustrating threaded spacer members, 58a-58d, for supporting electric fan 48 at chosen distance, 60, from base, 62, of fan support member 18, and disposed around circular hole, 64, having axis, 66, collinear with axis 30 of clamping member 12. Hole 64 is made sufficiently large that it does not obstruct the air flow from fan 48 into the air intake of the engine. Gussets, 68a, and 68b, are attached to spacer members 58a-58d in order to more ruggedly affix them to base 62. Holes, 70a-70d, for each spacer member 58a-58d, respectively, are adapted to receive mounting screws, 71a-71d, (FIG. 7 hereof) to fasten fan 48 to fan support member 18 using holes 54a-54d in fan 48, and threaded holes, 91a-91d in backing plate 20 (FIG. 7).

Figure 5B:
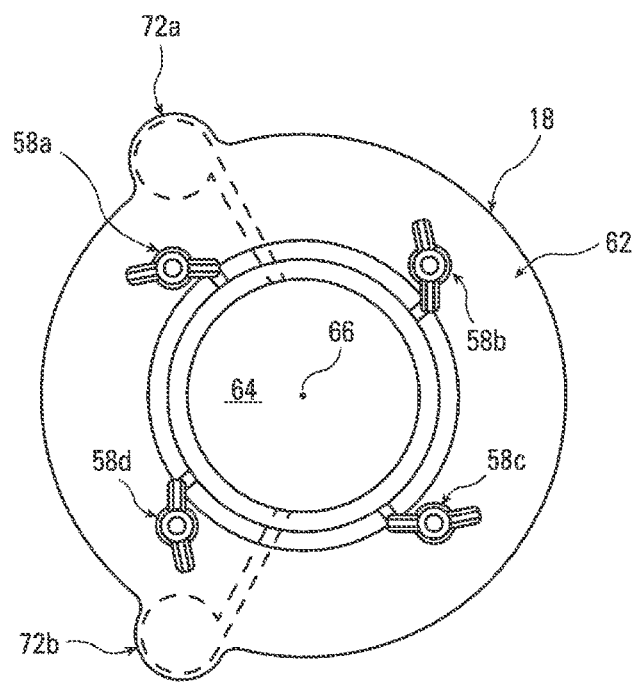
FIG. 5B is a schematic representation of a top view thereof.

As will be described in more detail in FIGS. 6A-6C below, extensions, 72a and 72b in base 62, cover the crankcase breather inlets to apparatus 10. FIGS. 5B and 5C are schematic representations of a top view and a side view of fan support member 18, respectively. It should be mentioned that directing the crankcase breather effluent into apparatus 10 is a function associated with use of the present apparatus with certain motorcycles, and not required on all internal combustion engines.

FIG. 6A is a schematic representation of a top perspective view of an embodiment of backing plate, 20, of the apparatus of the present invention, which also serves as the inner clamping member of the apparatus, illustrating attachment tubes, 74a and 74b, for the crankcase breather of a motorcycle onto which apparatus 10 is mounted, and channels, 76a and 76b, for directing any oil into carburetor or fuel injector intake 11. Covers 72a and 72b, are illustrated in FIGS. 5A-5C hereof. Various O-rings and channels 77, for sealing backing plate 20 to the chosen internal combustion engine are shown, but not specifically identified, since these will depend on the engine onto which apparatus 10 is mounted. Similarly, for engine mounting holes, 78a-78c. Base, 80, of backing plate 20, includes threaded holes, 82a-82d, disposed near the periphery, 84, of base 80, and around circular hole, 86, having axis, 88, collinear with axis 30 of clamping member 12. The threaded portions of holes 82a-82d are adapted to receive male threaded portions, 90a-90d, (FIG. 7 hereof) of bolts 22a-22b of FIG. 1. Hole 86 is made sufficiently large that it does not obstruct the air flow from fan 48 into the air intake of the engine through the air intake 11 of carburetor or fuel injector 13 concentric with and having an axis, 89 colinear with that (88) of hole 86.

FIG. 6B is a schematic representation of a top view of backing plate 20, and FIG. 6C is a schematic representation of a side view thereof, showing air intake 11 or carburetor or fuel injector 13 aligned with hole 86 in backing plate 20.

FIG. 7 is a schematic representation of an exploded top perspective view of the parts of an embodiment of the apparatus of the present invention, illustrating outer clamping member 12, air filter element 14, electric fan 48, fan support member 18, backing plate 20, and two sets of mounting bolts, 22a-22c and 71a-71d, as shown in FIGS. 1-6 hereof.

Figure 8:
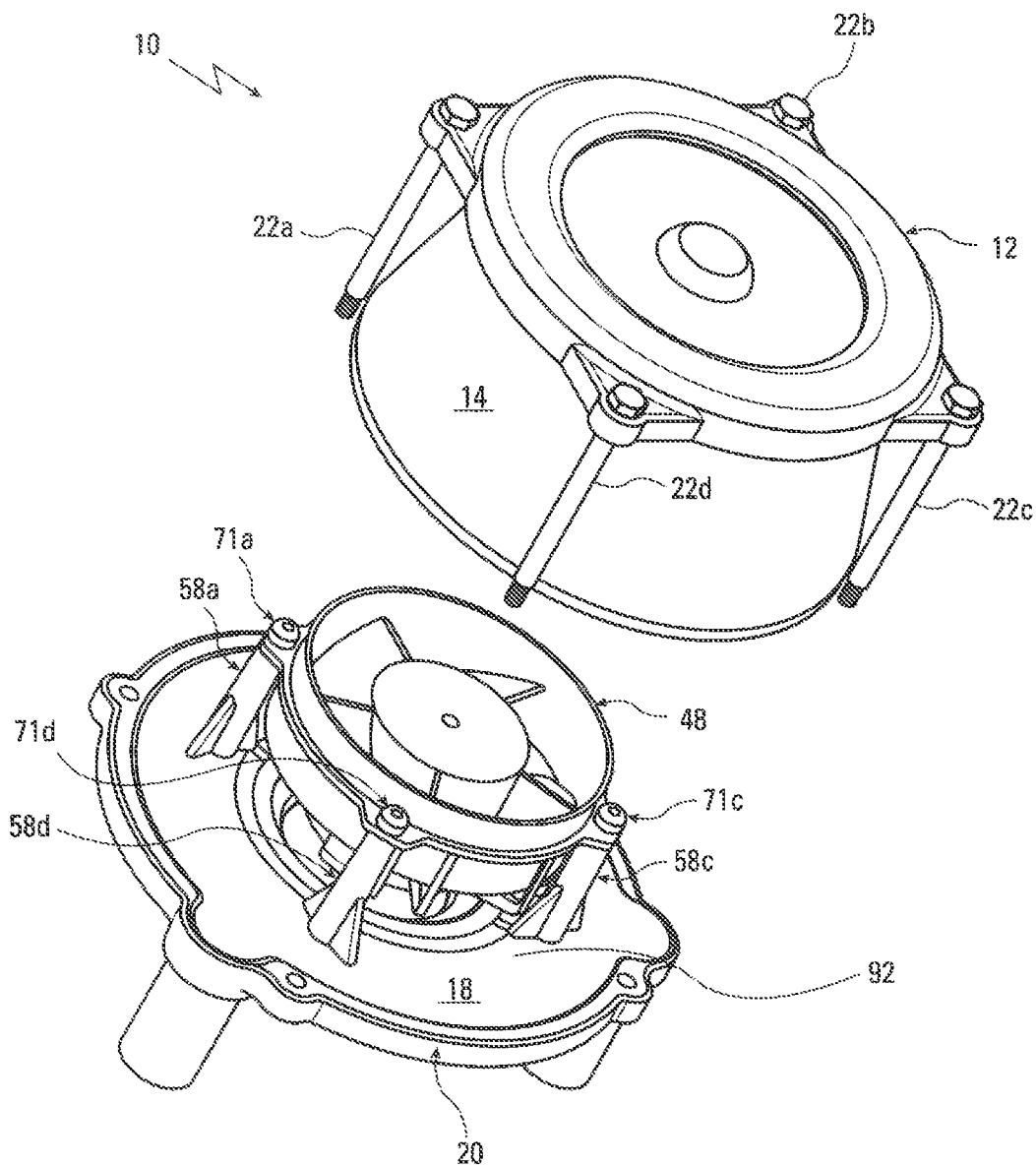
FIG. 8 is a schematic representation of a partially exploded top perspective view of the parts of an embodiment of the apparatus of the present invention, illustrating the outer clamp, the filter element, the electric fan, the fan support member, the backing plate, and two sets of mounting bolts, as shown in FIGS. 1-7 hereof, showing the fan attached to the fan support member, and the fan support member attached to the backing plate, wherein the space between the fan and the fan support member permits excess air directed by the fan toward the air intake of a carburetor or fuel injector to be directed out of the apparatus.

FIG. 8 is a schematic representation of a partially exploded top perspective view of the parts of an embodiment of the apparatus of the present invention, illustrating outer clamping member 12, air filter element 14, electric fan 48, fan support member 18, backing plate 20, and two sets of mounting bolts, 22a-22c and 71a-71d, as shown in FIGS. 1-6 hereof, showing fan 48 attached to fan support member 18, which is attached to backing plate 20, and showing space or volume, 92, between fan 48 and fan support member 18 wherein air flow unused, or in excess of that entering the air intake 11 of carburetor or fuel injector 13 may be directed out of apparatus 10 through volume 92.

As stated above, space 92 between fan support member 18 and backing plate 20 provided by spacer members 58a-58d permits excess air reaching hole 86 of backing plate 20 to exit through air filter element 14, and any deficiency in air flow to enter hole 86 through filter element 14. If there is a need for partially covering apparatus 10 with an air impermeable material, such as plastic or metal, for protection or strengthening of apparatus 10, it is believed to be advantageous if top portion 42 of filter element 14, and the surface of filter element 14 immediately outside of spacer members 58a-58d, remain uncovered by such materials.

FIG. 9 is a schematic representation of fan control system disposed in the vehicle in which apparatus 10 of the present invention is installed. Illustrated is controller, 94, attached to charging system, 96, and battery, 98, of the vehicle to which apparatus 10 is attached, through connector, 100. Controller 94 monitors the voltage generated by charging system 96 and disables fan 48 when the voltage drops below a preset value. It should be understood that the engine will continue to run without fan 48 operating, albeit with reduced performance. Further, controller 94 may disable fan 48 when the engine is not running, but the electrical system is operating.

As stated above, fan 48 may operate at a fixed speed or at various chosen speeds. Fan 48 may also be a continuously variable speed fan having its cfm output directed by controller 94, based on instantaneous engine requirements as indicated by input from measurement of wheel speed, throttle position, or ignition firing.

The number of cubic feet per minute (CFM) for the electric fan depends on the number of cubic inches (CI) of the engine, the revolutions per minute (RPM) of the engine, and the Environmental Protection Agency (EPA) standards for volumetric efficiency (VE). The EPA standard is between 75% and 90% VE for a stock production vehicle running at redline. As an example, the motor for a 103 CI Harley-Davidson Dyna® running at 6500 RPM as an adjusted redline value, 83% VE (average EPA redline VE) would require 153-161 CFM, while at 100% VE the motor would require 185-194 CFM to be compliant.

Having generally described embodiments of the present invention, the following EXAMPLE provides some specific details thereof.

EXAMPLE

Figure 10:
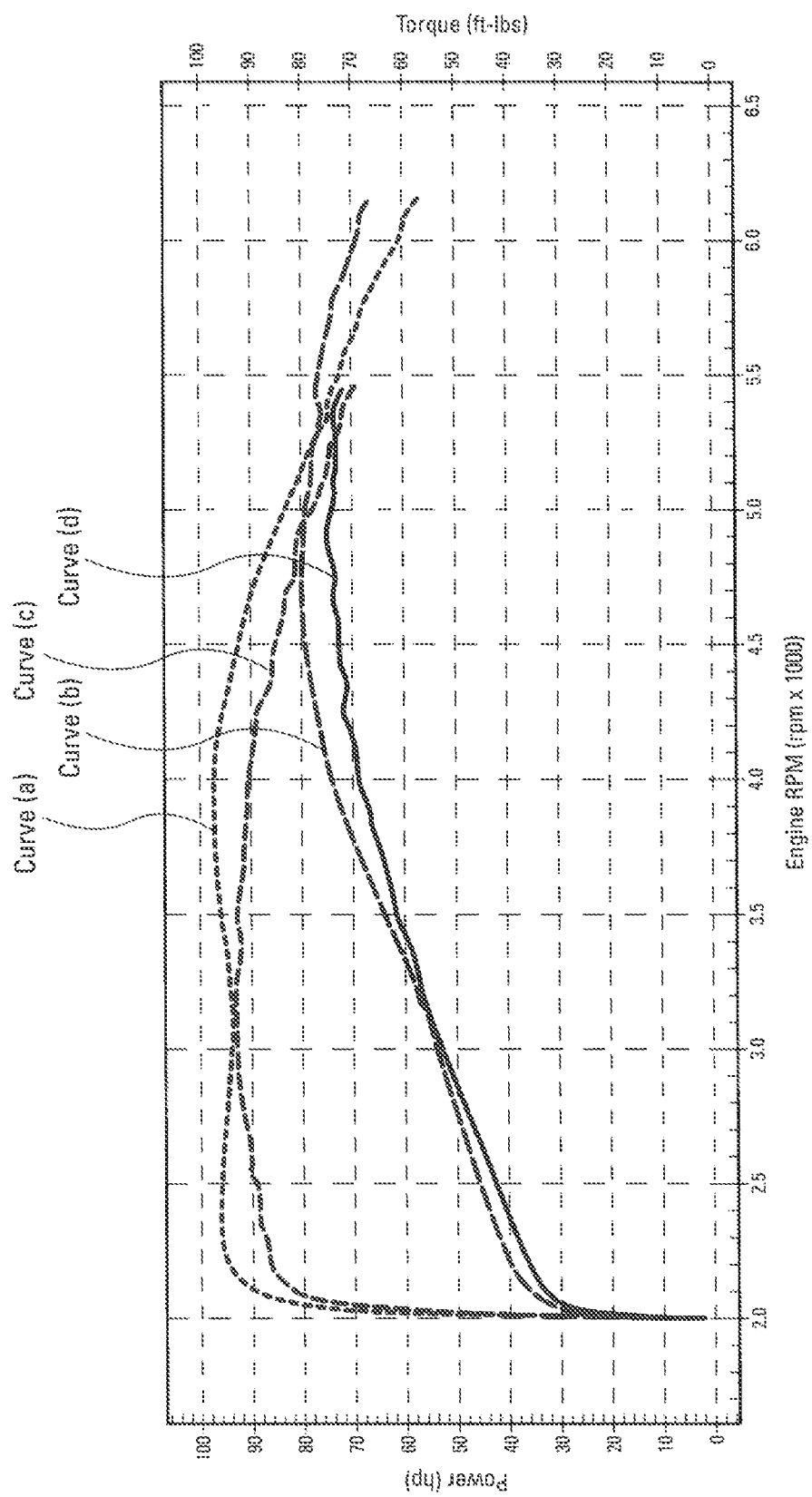
FIG. 10 is a graph of the torque (curves (a) and (c)) and horsepower (curves (b) and (d)) for a stock 2017 Harley-Davidson Dyna® FXDL motorcycle as a function of engine rpm generated using a Dynojet Model 250iX dynamometer from Dynojet Research, where embodiments of the present apparatus give rise to curves (a) and (b), when compared with the stock motorcycle (curves (c) and (d)).

FIG. 10 is a graph of the torque (curves (a) and (c)) and horsepower (curves (b) and (d)) for a stock 2017 Harley-Davidson Dyna® FXDL motorcycle as a function of engine rpm generated using a Dynojet Model 250iX dynamometer from Dynojet Research, where embodiments of apparatus 10 of the present invention give rise to curves (a) and (b), when compared with the stock motorcycle (curves (c) and (d)). A 150 cfm fan 48 was employed for this graph.

It should be mentioned that although the improved engine performance using apparatus 10 was demonstrated using a particular motorcycle, it is anticipated that similar performance will be observed for any internal combustion engine.

Figure 11:
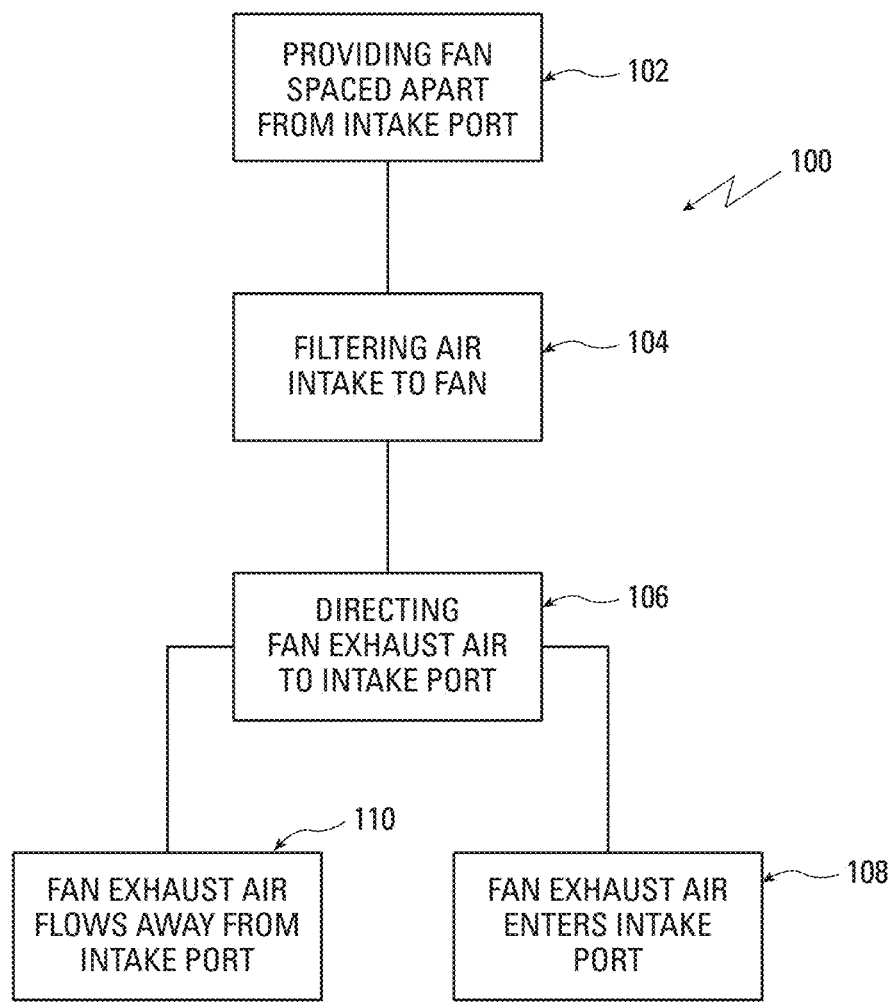
FIG. 11 is a flow diagram illustrating the method steps for increasing the air velocity and volume entering a carburetor or a fuel injection system having an air intake port for an internal combustion engine.

Turning now to FIG. 11, method steps, 100, illustrate the steps for increasing the air velocity and volume entering a carburetor or a fuel injection system having an air intake port for an internal combustion engine, including: providing a fan, 102, having an electric motor, an air intake, an air exhaust, and a chosen air flow, the fan being spaced apart from the air intake port; filtering the air intake for the fan, 104; directing air flowing from the air exhaust of the fan having a pressure greater than ambient pressure into the air intake port, 106; permitting air from the air exhaust of the fan to enter the intake port, 108, while permitting air from the air exhaust of the fan that does not pass into the air intake port to flow away from the fan and the air intake port of the internal combustion engine, 110.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for increasing the air flow velocity and flow volume entering a carburetor or a fuel injection system having an air intake for an internal combustion engine, comprising:
    providing a fan having an electric motor and fan blades rotated by the electric motor, for generating a chosen air flow, the fan being spaced apart from the air intake;
    providing a hollow air filter element having an open end, within which the electric motor and the fan blades are disposed, for filtering the chosen air flow for the fan;
    directing air flowing from the fan toward the air intake; and
    permitting air from the fan that does not pass into the air intake to flow away from the fan and the air intake of the internal combustion engine, and through the filter element.

2. The method of claim 1, wherein said internal combustion engine comprises a motorcycle engine.

3. The method of claim 1, wherein said electric motor is battery powered.

4. The method of claim 1, wherein said internal combustion engine has an electrical system, and the electric motor is powered from the electrical system.

5. The method of claim 3, wherein the electric motor rotates the fan blades at a constant air flow independent of operation speed of said internal combustion engine.

6. The method of claim 5, wherein the flow of air from the fan is between 150 and 350 cfm.

7. The method of claim 1, wherein the electric motor operates at a continuously variable speed based on instantaneous requirements of said internal combustion engine.

* * * * *